Nov. 2, 1954     F. LYIJYNEN     2,693,221
METHOD AND APPARATUS FOR MAKING LAMINATED MATERIALS
Filed June 22, 1951     2 Sheets-Sheet 1
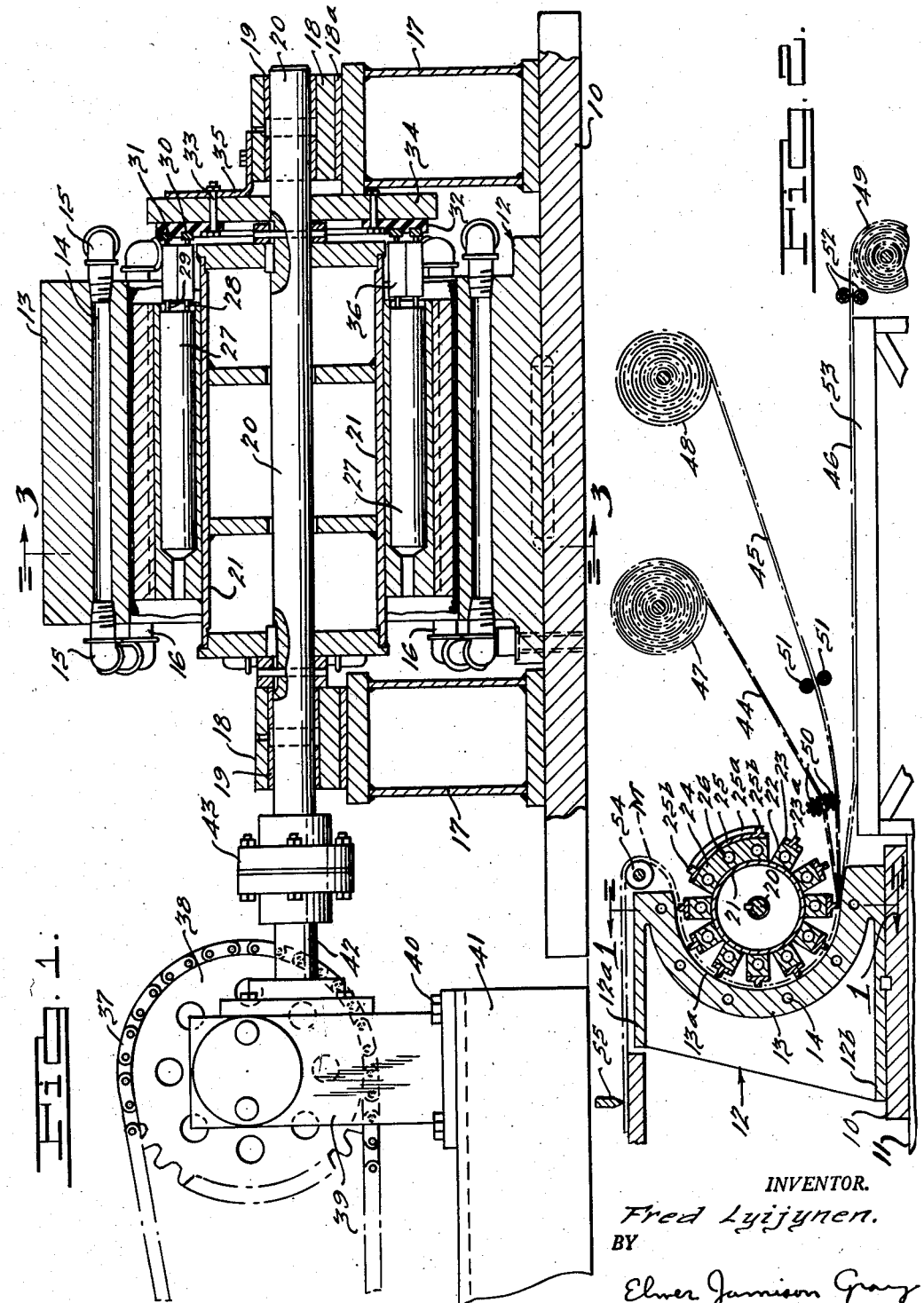
INVENTOR.
Fred Lyijynen.
BY
Elmer Jamison Gray
ATTORNEY.

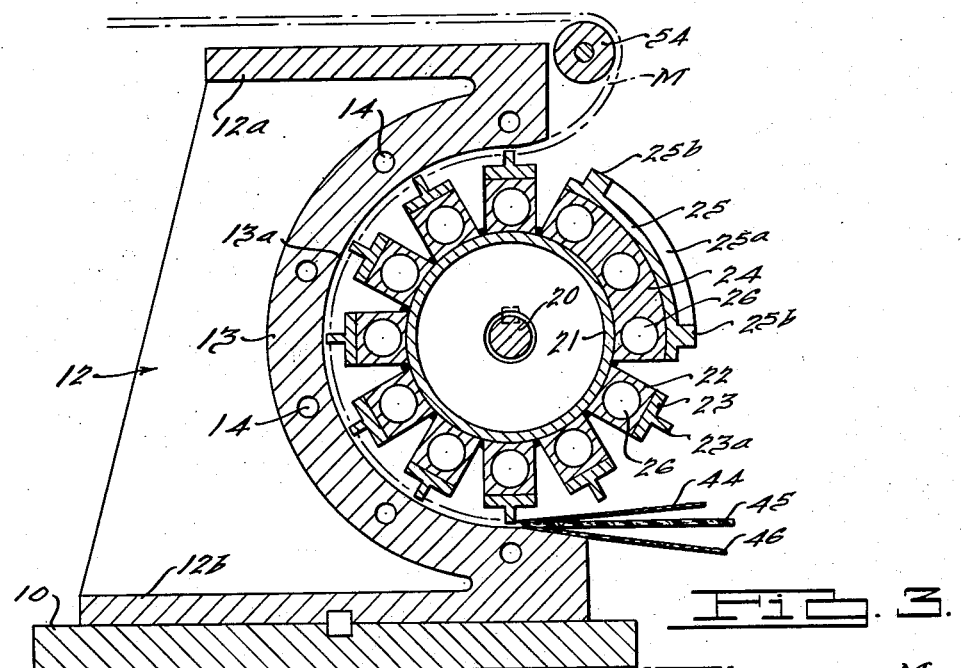

United States Patent Office 2,693,221
Patented Nov. 2, 1954

2,693,221

METHOD AND APPARATUS FOR MAKING LAMINATED MATERIALS

Fred Lyijynen, Detroit, Mich., assignor to Briggs Manufacturing Co., Detroit, Mich., a corporation of Michigan Application June 22, 1951, Serial No. 233,026

14 Claims. (Cl. 154—1)

This invention relates to the manufacture of laminated upholstery material particularly, although not exclusively, adapted for use as the covering material for vehicle seat and back structures or for trimming the interiors of vehicle bodies, such as automobile bodies. The laminations of the upholstered material, which preferably include a top or cover sheet of fabric or other decorative material, an intermediate layer of padding material and a foundation sheet, are bonded together at predetermined regions between heated dies by means of a bonding substance which usually comprises a thermoplastic or thermosetting resinous material. When completely fabricated for use the bonded laminated material is customarily in the form of panels dimensioned for the purposes intended.

Heretofore, in the fabrication of laminated upholstery panel material or trim panels it has been the practice to cut the sheets or laminations to desired panel size, lay up or assemble the sheets in proper superimposed relation, and introduce the assembled layers or sheets into a hydraulic press between heated platens which bond the layers together at desired localities under the influence of heat and pressure. Hydraulic presses employed for these purposes are costly and the cost of production consequent to their use is enhanced owing to inactive periods when the presses are open to permit loading thereof and removal of the panels therefrom, also on account of the substantial intervals of time required for carrying out the bonding operations so as to complete the curing or polymerization of the bonding resins used to bond the panel laminations together. In addition, costs of production are relatively high on account of the personnel needed to conduct operations, and the time and handling required to cut the various layers or sheet materials to panel size and assemble them preparatory to introduction into the press.

An object of the present invention is to overcome previous disadvantages encountered in the fabrication of laminated panel materials and to reduce machine, personnel and production costs while at the same time enabling superior laminated articles to be produced for trim or covering purposes. This object of the invention is accomplished by eliminating individual molding of laminated panels and in lieu thereof molding the laminated materials by a continuous method in which the superimposed panel materials in sheet or strip form are fed between a rotatable die and a fixed or stationary curved die, the former cooperating with the fixed die to compact the laminations at selected regions and to feed the laminations through the machine relatively to the fixed die while in contact with the curved surface thereof. Thus, successive portions of the rotatable die engage and compress the materials against the curved surface of the fixed die upon entering the machine, each such die portion maintaining uniform pressure upon the materials as the latter travel a predetermined distance and for a predetermined period of time in contact with and relatively to the curved surface of the fixed die, whereupon as the materials emerge from between the dies they are bonded together and may thereafter pass through a cutting mechanism effective to cut the laminated sheet or strip into panels.

In the embodiment of the invention herein illustrated, there is provided a die mechanism for bonding together under the influence of heat and pressure and along predetermined pattern lines or regions upholstery material comprising a cover sheet or fabric, an intermediate padding sheet and a foundation sheet which, for the purposes of upholstering a seat or back structure, is flexible or pliable. The machine comprises a fixed or stationary upright die which is concaved to provide a generally arcuate, smooth die surface. A rotatable drum is associated with the stationary die and is mounted upon a shaft driven at the desired speed through suitable drive mechanism. The center of curvature of the curved surface of the stationary die corresponds substantially to the axis of rotation of the die drum and the latter carry die elements which travel within the cavity of the stationary die along and proximate to the curved surface thereof. The superimposed laminations of materials in strip form are fed into the machine between the movable die elements and fixed die surface, which successively grip and compact the materials at the selected regions. The materials are fed by the movable die elements against and along the smooth curved die surface of the fixed die during which time the materials are heated to cure or set the bonding substance. The length of time that each successive compressed portion of the materials is held in compacted condition under the influence of heat is determined either by the effective length of the curved die surface or the speed of revolution of the die drum or both, and upon emergence from between the dies each such compacted portion will be permanently bonded together. Thus, there is provided in accordance with the invention a die apparatus for continuously bonding together laminated materials along given pattern lines or regions which are repeated after each revolution of the drum as the materials are fed through the apparatus.

Other objects of this invention will appear in the following description and appended claims, reference being had to the accompanying drawings forming a part of this specification wherein like reference characters designate corresponding parts in the several views.

Fig. 1 is a transverse sectional elevation, taken substantially through lines 1—1 of Fig. 2, illustrating a machine or apparatus constructed in accordance with one embodiment of the present invention.

Fig. 2 is in part a diagrammatic view and also in part a vertical longitudinal sectional view of the apparatus shown in Fig. 1.

Fig. 3 is a vertical section taken substantially through lines 3—3 of Fig. 1 looking in the direction of the arrows.

Fig. 4 is a fragmentary plan view of a strip or sheet of bonded laminated materials after issuing from the apparatus shown in Figs. 1 to 3 inclusive.

Fig. 5 is an enlarged fragmentary sectional view taken substantially through lines 5—5 of Fig. 4 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated, by way of example, an apparatus for consolidating or bonding together laminations of sheet or strip material in a continuous manner. This machine or apparatus comprises a base plate or platform 10 which may be mounted upon a suitable upright frame structure or table 11. Rigidly mounted upon the base 10 is a fixed or stationary die structure 12 which, in the present instance, comprises upper and lower horizontal frame members 12a and 12b, respectively, which are joined together at the front of the machine by a fixed or stationary heated die member 13. The fixed die member or platen 13 is curvilinear and is of the desired width transversely of the machine so as to accommodate strip or sheet material of any predetermined width. Although the die member 13 is herein illustrated as being substantially uniform in cross-section thereby providing curved front and rear faces, it will be understood that for the purposes of the present invention it is only of importance that the front face or surface 13a of the die be curvilinear so as to provide a stationary generally arcuate pressing surface against which the laminated materials are compacted and bonded together through the medium of travelling die elements carried by a rotatable drum hereinafter described.

The curved die 13 may be heated and maintained at the desired molding temperature by any suitable means, preferably through the use of steam or by electrical means. In the present instance steam is used to heat the die 13 and maintain it at the required temperature during the molding or bonding operation. Accordingly, the die or platen 13 is provided with a suitable number of transverse conduits or steam passages 14 extending transversely therethrough. Each passage or conduit is tapped at opposite ends to receive threaded couplings 15 which in turn are connected to piping 16 through which steam is forced under pressure from a suitable source of supply and circulated through the steam passages or conduits in the die or platen 13.

Rigidly mounted upon the base or platform 10 at opposite ends of the stationary die structure are a pair of similar hollow standards 17. Mounted upon these standards through the medium of suitable shims 18a are fixed bearing blocks 18 bored to receive bearing bushings 19 within which opposite ends of a shaft 20 are journalled. A hollow drum 21 is keyed to the shaft 20 for rotation therewith. This drum carries various die elements of predetermined design or configuration for impressing grooves, depressions, indentations or the like in the laminated materials. In the present instance, by way of example, the supporting means for the die elements or members comprise bars or blocks rigidly secured to the outer surface of the drum 21 and arranged as desired either transversely of the drum or circumferentially thereof so as to bond the laminated materials together along predetermined lines or regions, such as shown in Fig. 4 hereinafter described.

As an exemplification of a die structure for effecting a bond between the laminated materials along lines producing a pattern on the order of that illustrated in Fig. 4, there is rigidly secured, as by welding, to the outer surface of the drum 21 a number of die supporting bars or members 22 which project radially of the drum and extend transversely of the machine. Detachably secured in any suitable manner to the outer faces of the bars 22 are die members 23 carrying, in the present instance, pressing elements in the form of ribs 23a. These ribs or die elements, as later described, produce in cooperation with the stationary die 13 spaced parallel transverse grooves in the laminated materials. Where it is desirable, as illustrated in Fig. 4, to form spaced longitudinal grooves or depressions in the materials joined by transverse grooves there may be rigidly secured to the drum an arcuate die supporting plate or block 24 of desired length circumferentially of the drum. Detachably secured in any suitable manner to the curvilinear die supporting plate 24 is a die member 25 carrying arcuate longitudinal curved pressing elements in the form of arcuate ribs 25a joined at opposite ends by transverse ribs 25b.

The die elements or ribs carried by the supporting members 22 and 24 may be heated in any suitable manner and maintained at the desired temperature for bonding the laminated materials together. In the present instance the die elements are heated electrically through the medium of electrical resistance elements. These may be installed either within the drum 21 or within the die supporting members 22 and 24. In the present instance the die supporting members are bored to provide holes or cavities 26 within which are mounted resistance heating elements 27 each of which is provided with a pair of contact terminals 28 and 29. The contact terminals 28 and 29 project into position to contact and ride over a pair of circular conductor strips or tracks 30 and 31, respectively, which are embedded in and carried by a circular insulating member 32. The latter is bolted at 33 to a fixed supporting disk or plate 34 rigidly secured by means of an angle 35 to the stationary bearing block 18 at the right-hand side of the machine as viewed in Fig. 1. Each pair of projecting contact terminals 28 and 29 for the electric resistance elements 27 is encased within an insulating guard or protector member 36. It will be evident from the foregoing that during rotation of the die drum 21 the contact terminals 28 and 29 will maintain contact with and ride along the conductor tracks 30 and 31, and since these tracks are connected in circuit to a suitable source of electricity the heating elements 27 will be energized thereby to heat the die supporting members 22 and 24.

The shaft 20 and the die drum 21 secured thereto are rotated through the medium of power supplied from a suitable electric motor (not shown) which drives through a sprocket chain 37 a sprocket gear 38. This gear is drivingly connected in any well known manner to reduction gearing mounted within a casing 39 bolted at 40 to a platform 41. The reduction gearing within the casing 39 drives an output shaft 42 which is connected by a coupling 43 to the drum shaft 20. It will be understood that the reduction gearing is so selected as to drive the shaft 20 and, hence, the die drum 21 at the desired speed.

It will be noted that the stationary die member 13 forms in effect a substantially arcuate cavity within which the drum 21 projects, the position of this drum and its supporting shaft 20 with relation to the die 13 being such that during rotation of the drum the successive die elements carried thereby move into the concave cavity of the die 13 with the outer working surfaces of the die elements 23a, 25a and 25b travelling in close proximity to the curved or arcuate surface 13a of the die 13. These outer working surfaces of the die elements, as shown in Fig. 3, move along the curved die surface 13a in uniformly spaced relation thereto, the spacing between the die elements and the fixed die surface 13a being predetermined to achieve the proper compacting of the laminated materials, and this spacing may be varied to accommodate different thicknesses of material or variations in the number of laminations in any suitable manner such as by means of shims which may be introduced between the die members 23 and 25 and the die supporting members 22 and 24.

The upholstery material, which is to be bonded together along predetermined pattern lines or regions, comprises, as illustrated in Figs. 4 and 5, a top cover sheet 44 of cloth or other desired fabric, an intermediate padding sheet or layer 45 which may be sponge or foam rubber, wadding or the like, and a foundation sheet 46. Where the laminated material is to be used for upholstering the seat or back structure the foundation sheet 46 is composed of a flexible or pliable material, such as coarse woven sheeting or other fabric. As illustrated in Fig. 2, the materials or laminations 44, 45 and 46 are preferably fed to the machine in strip form from suitably supported rolls 47, 48 and 49, respectively. The top sheet or strip 44 may be fed from the roll 47 through tension guide rolls 50 which are preferably driven by gearing so as to enable these rolls to be driven at variable speeds so as to vary the tautness of the cover sheet as it passes through the machine. The padding layer 45 may be fed from the roll 48 through tension guide rolls 51, and the foundation layer 46 may be fed from the roll 49 through tension guide rolls 52 over a table 53 and thence into the machine. The laminations or layers in superimposed relation are fed into the machine between the rotatable die members and the fixed or stationary die member, and the die elements 23a, 25a and 25b during rotation of the drum 21 successively grip and compact the materials against the smooth arcuate die surface 13a. The die elements embed themselves in the materials and feed them along the fixed die surface 13a. After emerging from the upper portion of the die apparatus, as shown in Fig. 2, the laminated material in bonded condition passes over a guide roll 54 and is thence fed rearwardly over the upper horizontal portion 12a of the fixed die 12 to a cutting or shearing mechanism, such as illustrated diagrammatically at 55, which cuts the strip into panels of the desired dimensions.

In Figs. 4 and 5 there is illustrated, by way of example, a laminated material bonded together along certain pattern lines. It will be understood that these have been selected arbitrarily for the purpose merely of exemplifying a laminated product produced by a die apparatus embodying the present invention. As illustrated in Fig. 4, the die member 25 with its die elements 25a and 25b forms, during each revolution of the drum 21, a seat panel P. This panel is defined by marginal compressed bonded-together areas indicated at 56, 57 and 58 which extend continuously around the four sides of the panel. The bonded areas 56 and 58 are formed by the die elements 25b and the areas 57 are formed by two of the die elements 25a located at opposite ends of the die plate 25. The panel P is bonded together along parallel pattern lines 59 joining the areas 56 and 58, these being formed by arcuate die elements or ribs 25a carried by the die plate 25. When the successive panels P, formed in the laminated material, pass through the cutting or shearing mechanism 55, they are cut out or separated from the laminated strip along the outer marginal lines 61 bounding the bonded areas 56, 57 and 58. Since these areas are flat and compressed they provide a convenient means for stitching the upholstered seat cover P to the trim fabric covering the upright sides, front and back of the seat. It will be seen that by compressing or bonding the materials forming the panel P along the narrow parallel lines 59, there are provided intervening uncompressed padded areas 60. As also illustrated in Figs. 4 and 5, the laminated strip, as it is fed through the machine, is compressed and bonded together by the die elements 23a along transverse lines 62, these die elements producing relatively deep grooves along these lines and intervening uncompressed padded areas 63. It will be understood that in bonding the materials along the lines 56—59, they are compressed together in a manner generally similar to that illustrated at 62 in Fig. 5.

Although in the present embodiment the die apparatus is illustrated for the purpose of producing flexible or pliable upholstery panels especially useful as coverings for back and seat structures, it will be understood that the invention may be used for the purpose of fabricating relatively stiff trim panels such as are used in trimming the insides of automobile doors. For such purposes the foundation layer may comprise a comparatively stiff material such as fiberboard. Such material, however, will be sufficiently bendable so that it may be fed through the machine in conjunction with the padding and cover sheets. In order to reduce to a minimum the amount of bend to which the foundation board would be subjected to when fed along the curved die surface 13a, this surface as well as the diameter of the drum 21 may be relatively great.

The bonding substance for bonding together the laminations may be applied either to the surface of the foundation sheet 46 or the surface of the padding layer 45 or both and is usually somewhat tacky and of a kind that will be cured or polymerized under the influence of the heat from the die member 13 and the rotatable die elements which cooperate therewith. Such bonding substance preferably includes, at least in part, a thermosetting resin such as a phenol-formaldehyde resin or a urea formaldehyde resin which is in an intermediate stage of reaction when applied to the laminations and which will cure or set permanently under the influence of heat upon being subjected thereto during a predetermined period of time. In connection with upholstery panels for seat and back covers it is desirable that the bonding substance be such as not only to permanently bond the laminations together but also to provide bonded lines or areas which are flexible or pliable. This is important in connection with seat or back cushions which are subjected to deforming or distorting forces due to the weight of the occupant of the seat. It has been found that thermosetting resins, especially of the phenolic type, when used as the bonding medium produce undesirably stiff bonding lines or regions which are comparatively brittle and, when deformed or bent out of shape due to the weight of the occupant of the seat, crack or pucker and eventually produce an unsightly appearance along the bonding pattern lines.

I have found that relatively flexible or pliable bonding lines or regions may be produced by means of a bonding resin comprising as the principal constituents thereof a rubber-like bonding substance mixed with a phenolic resin. As an example, a rubber cement composed principally of approximately three parts of a synthetic or natural rubber or latex and one part of rosin or colophony may be utilized. A liquid varnish may be prepared by mixing this cement and a phenolic resin in a water carrier, the cement and resin being of the types that are soluble or miscible in water. This resin mixture may comprise, for example, from approximately 5% to 11% by weight of phenolic resin and from approximately 22% to 28% by weight of rubber cement, the balance of the varnish being water. Such a bonding mixture, when cured under heat and pressure, will produce flexible or pliable bonding lines or areas and will withstand the bending or deforming forces to which the seat or back cushion is subjected to on account of the weight of the occupant.

I claim:

1. In a die apparatus for bonding together laminated materials through the medium of a bonding material, said materials including a backing sheet, a cover sheet and an intermediate padding sheet; a fixed die member formed with a concave recess providing a smooth plain curved die surface, a rotatable die member, die elements carried thereby and movable during rotation of the rotatable die member along and proximate to said curved die surface, and means for rotating said die member to cause said die elements to successively engage and embed in said cover and padding sheets at spaced localities and to compact the same at said localities against said backing sheet and curved die surface and feed the sheets relatively to and along said surface to bond the same together at said localities.

2. In a die apparatus for bonding together laminated materials through the medium of a bonding material, said materials including a backing sheet, a cover sheet and an intermediate padding sheet; a fixed die member formed with a concave recess providing a smooth plain curved die surface, a rotatable die member, die elements carried thereby and movable during rotation of the rotatable die member along and proximate to said curved die surface, means for heating said die elements, and means for rotating said die member to cause said die elements to successively engage and embed in said cover and padding sheets at spaced localities and to compact the same at said localities against said backing sheet and curved die surface and feed the sheets relatively to and along said surface to bond the same together at said localities.

3. In a die apparatus for bonding together laminated materials through the medium of a bonding material, said materials including a backing sheet, a cover sheet and an intermediate padding sheet; a fixed die member formed with a concave recess providing a smooth plain curved die surface, a rotatable die member, die elements carried thereby and movable during rotation of the rotatable die member along and proximate to said curved die surface, and means for rotating said die member to cause said die elements to successively engage and embed in said cover and padding sheets at spaced localities and to compact the same at said localities against said backing sheet and curved die surface and feed the sheets relatively to and along said surface to bond the same together at said localities, said curved die surface having its center of curvature substantially at the axis of rotation of said rotatable die member and said die elements being spaced from said die surface a less distance than the thickness of said materials.

4. In a die apparatus for bonding together laminated materials including a backing sheet, a cover sheet and an intermediate padding sheet; a fixed die member formed with a concave recess providing a smooth curved die surface, a rotatable die member, die elements carried thereby and movable during rotation of the rotatable die member within said recess along and proximate to said curved die surface and spaced therefrom a less distance than the thickness of said materials, means for rotating said die member to cause said die elements to successively engage and embed in said cover and padding sheets to compact the same at spaced localities against said backing sheet and curved die surface and feed the sheets relatively to and along said surface to bond the same together at said localities, and means for heating said sheets while in contact with said die surface.

5. In a die apparatus for bonding together laminated sheets through the medium of a bonding material introduced between adjacent sheets, a fixed die member formed with a concave recess providing a plain curved die surface, a rotatable die member, die elements carried thereby and movable during rotation of the rotatable die member within said recess along and proximate to said curved die surface, means for rotating said die member to cause said die elements to successively engage said laminated sheets to compact the same against said curved die surface and feed the sheets relatively to and along said surface to bond the same together, said curved die surface having its center of curvature substantially at the axis of rotation of said rotatable die member and said die elements being spaced from said die surface a less distance than the combined thickness of said sheets, and means for heating said sheets while in contact with said die surface.

6. A die apparatus for bonding together laminations of material through the medium of a bonding substance, comprising a die member having a fixed generally arcuate die surface, a rotatable drum, die elements mounted on the outer face of said drum, means for mounting said drum adjacent said die member to cause each die element during rotation of the drum to move into position to compact said laminations at spaced localities against said die surface adjacent one end thereof and to maintain said laminations in compacted relation against said die surface to bond the same together at said localities as each such die element travels along said surface to a point adjacent the opposite end thereof, said die elements being spaced from said die surface a less distance than the combined thickness of said laminations, each die element at said latter end moving away from said die surface to release said laminations, and means for heating said laminations during the travel thereof along said die surface.

7. A die apparatus for bonding together through the medium of a bonding substance, a backing sheet and a plurality of cover sheets superimposed thereon, comprising a fixed upright die member having a recess terminating in a front opening and having a curved back wall forming a plain die surface, a rotatable drum, die means mounted upon the outer side of said drum, means for mounting said drum adjacent said opening to position portions of said die means within said recess with the outer surfaces thereof proximate to said die surface so as to embed in said cover sheets at spaced localities and press the same against said backing sheet and die surface and bond the same together, and means for rotating said drum to cause successive portions of said die means to engage said laminations adjacent one end of said opening, feed the same in compacted condition along said die surface, and release the same at the opposite end of said opening.

8. A die apparatus for bonding together laminations of material through the medium of a bonding substance, comprising a fixed upright die member having a recess terminating in a front opening and having a curved back wall forming a plain die surface, a rotatable drum, die means mounted upon the outer side of said drum, means for mounting said drum adjacent said opening to position portions of said die means within said recess with the outer surfaces thereof proximate to said die surface so as to compact said laminations against said surface and bond the same together, means for rotating said drum to cause successive portions of said die means to engage said laminations adjacent one end of said opening, feed the same in compacted condition along said die surface, and release the same at the opposite end of said opening, and means for heating said laminations during the travel thereof along said die surface, said die means being spaced from said die surface a less distance than the combined thickness of said laminations.

9. A die apparatus for bonding together laminations of material through the medium of a bonding substance, comprising a fixed upright die member having a recess terminating in a front opening and having a curved back wall forming a plain die surface, a rotatable drum, die means mounted upon the outer side of said drum, means for mounting said drum adjacent said opening to position portions of said die means within said recess with the outer surfaces thereof proximate to said die surface so as to compact said laminations against said surface and bond the same together, means for rotating said drum to cause successive portions of said die means to engage said laminations adjacent one end of said opening, feed the same in compacted condition along said die surface, and release the same at the opposite end of said opening, said die surface throughout the major length thereof being arcuate with the center of curvature thereof substantially at the axis of rotation of the drum, and means for heating said laminations during the travel thereof along said die surface, said die means being spaced from said die surface a less distance than the combined thickness of said laminations.

10. In a die apparatus for bonding together laminated materials through the medium of a bonding substance, said materials including a backing sheet, a cover sheet and an intermediate padding sheet; a fixed upright die member having a generally arcuate plain die surface, a rotatable drum, a curved die supporting member secured to the outer surface of said drum and having spaced transversely extending rib-like die elements and longitudinally extending curved rib-like die elements extending between said first named die elements, means for supporting and rotating said drum to move said die elements to embed the same in said cover and padding sheets at predetermined areas and press the same against said backing sheet and die surface at said areas and to feed the materials along and relatively to said die surface during a portion of one revolution of the drum, said die elements during another portion of one revolution of the drum moving away from said die surface to release the materials, and means for heating the materials while under compression between said die elements and die surface.

11. The method of bonding together laminated materials including a cover sheet and an underlying padding sheet, including the steps of introducing said materials between a stationary curved substantially plain die surface and die elements interposed between said materials and a rotatable drum, and rotating said drum to feed said materials along and relative to said die surface and to cause said die elements to travel with said materials and to embed in said cover and padding sheets at spaced localities against said die surface and at the same time bonding said sheets together at said localities.

12. In a die apparatus for bonding together laminated materials through the medium of a bonding material, said materials including a cover sheet and an underlying padding sheet, a stationary die member concaved to provide a recess having a smooth plain curved die surface, a rotatable drum, die elements adapted to be interposed between said drum and sheets and movable therewith during rotation of the drum along and proximate to said curved die surface, and means for rotating said drum to force said die elements to embed in said cover and padding sheets at spaced localities and to compact the same at said localities against said curved die surface and to feed the sheets relatively to and along said surface to bond the same together at said localities.

13. In a die apparatus for bonding together laminated materials through the medium of a bonding material, said materials including a cover sheet and an underlying padding sheet, a stationary die member concaved to provide a recess having a smooth plain curved die surface, a rotatable drum, die elements adapted to be interposed between said drum and sheets and movable therewith during rotation of the drum along and proximate to said curved die surface, means for rotating said drum to force said die elements to embed in said cover and padding sheets at spaced localities and to compact the same at said localities against said curved die surface and to feed the sheets relatively to and along said surface to bond the same together at said localities, and means for applying heat to said sheets at said localities.

14. In a die apparatus for bonding together laminated materials through the medium of a bonding material, said materials including a cover sheet and an underlying padding sheet, a stationary die member concaved to provide a recess having a smooth plain curved die surface, a rotatable drum, die elements adapted to be interposed between said drum and sheets and movable therewith during rotation of the drum along and proximate to said curved die surface, and means for rotating said drum to force said die elements to embed in said cover and padding sheets at spaced localities and to compact the same at said localities against said curved die surface and to feed the sheets relatively to and along said surface to bond the same together at said localities, said die elements having sheet embedding portions spaced from said die surface a less distance than the thickness of said materials during operation of the die elements to compact said materials at said localities.

References Cited in the file of this patent

UNITED STATES PATENTS

| Number | Name | Date |
| --- | --- | --- |
| 1,523,658 | Matthias | Jan. 20, 1925 |
| 2,021,095 | Ball | Nov. 12, 1935 |
| 2,041,356 | Kraft | May 19, 1936 |
| 2,252,704 | Davies | Aug. 19, 1941 |
| 2,578,709 | Lyijynen | Dec. 18, 1951 |